C. E. BAUER.
FULCRUM AND METHOD OF MAKING THE SAME.
APPLICATION FILED OCT. 18, 1920.

1,426,705.  Patented Aug. 22, 1922.
2 SHEETS—SHEET 1.

Witness:
Geo. T. Aurion

Inventor
Carl E. Bauer
By Murray Lots & Nelson
Attys

C. E. BAUER.
FULCRUM AND METHOD OF MAKING THE SAME.
APPLICATION FILED OCT. 18, 1920.
1,426,705.
Patented Aug. 22, 1922.
2 SHEETS—SHEET 2.
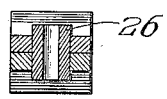
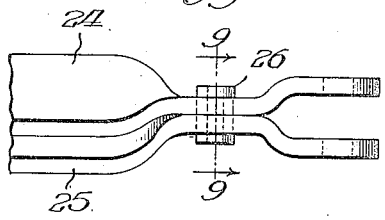
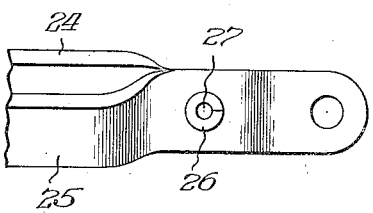
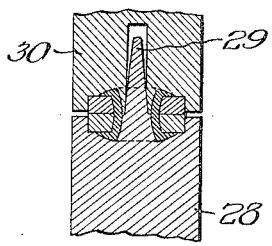
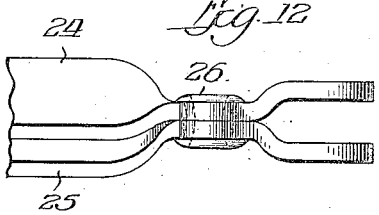
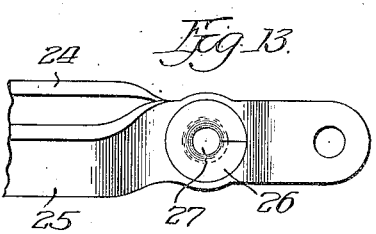
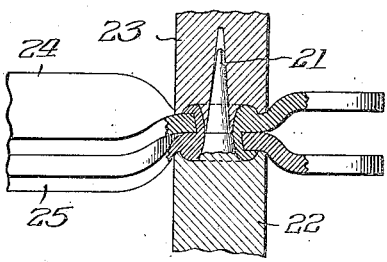

UNITED STATES PATENT OFFICE.

CARL E. BAUER, OF HAMMOND, INDIANA.

FULCRUM AND METHOD OF MAKING THE SAME.

1,426,705.

Specification of Letters Patent. Patented Aug. 22, 1922.

Application filed October 18, 1920. Serial No. 417,639.

*To all whom it may concern:*

Be it known that I, CARL E. BAUER, a citizen of the United States, and resident of Hammond, in the county of Lake and State of Indiana, have invented certain new and useful Improvements in a Fulcrum and Method of Making the Same, of which the following is a specification.

My invention relates to brake beam fulcrums and particularly to a novel method of producing such fulcrums in a simple and economical manner.

One of the objects of my invention is to provide a fulcrum adapted for use in connection with trussed brake beams which employ an angular compression member and a rod tension member. Such fulcrums or struts are subjected to unusual strains, due to the fact that the device acts not only as a strut for the truss but also as a fulcrum for the brake lever. In the fulcrum of my invention I provide two bars of duplicate form, then suitably bend and twist the same, then punch a small opening, the metal being merely laterally displaced instead of being removed, the displaced metal on the two bars being complementary, whereby the displaced metal of one bar enters the opening formed by punching the mating bar. Thereafter the bars are forged to spread the metal and increase the size of the opening to that required for the accommodation of the tension rod.

The invention will be more readily understood by reference to the accompanying drawings, in which, Figure 1 is a side view of a blank such as I employ;

Fig. 6 shows the completion of the forging operation;

Fig. 8 is a view of a modified form of fulcrum at the point preceding the forging operation;

Fig. 9 is a sectional view on the line 9—9 of Fig. 8;

Fig. 10 is a side view of the fulcrum shown in Fig. 8;

Fig. 11 is a sectional view through the dies employed for completing the forging operation; and Figs. 12 and 13 are views of the completed fulcrum.

Figure 1:
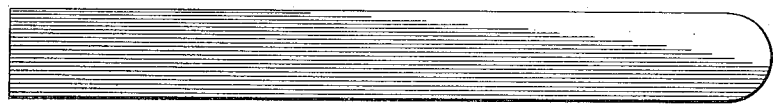
Figure 2:
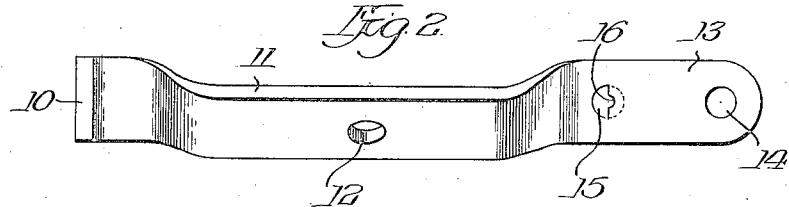
Fig. 2 is a view after the initial punching and shaping operation.
Figure 3:
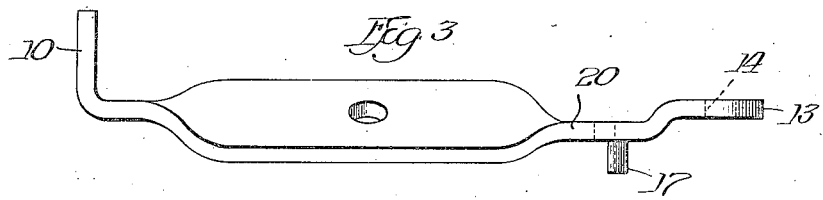
Fig. 3 is a view taken at right angles to that of Fig. 2.
Figure 4:
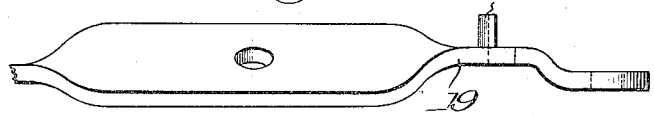
Fig. 4 is a view similar to Fig. 3 of the form of mating bar.
Figure 5:
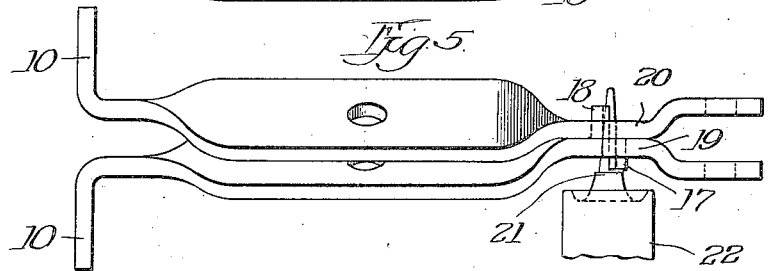
Fig. 5 shows the bars joined at the beginning of the forging operation.
Figure 7:
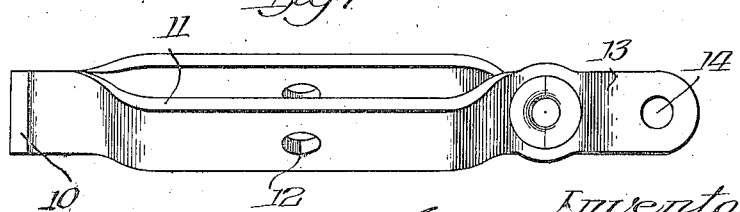
Fig. 7 is a view of the completed fulcrum.

Referring to the drawings it will be seen that I provide a pair of duplicate flat bars, one of which is illustrated in Fig. 1. In a forging operation one end of each bar may be bent at right angles to form the foot 10 and the twisted intermediate portion 11. The portion 11 may have an aperture 12 for a brake rod pivot pin and the straight projecting end portion 13 may have an aperture 14 for attachment of a supporting link. A punch of suitable shape may be employed for forming the semicircular aperture 15 and the smaller concentric semicircular aperture 16, the metal originally occupying said openings, being merely displaced laterally as indicated at 17 and acting as a filler, or in other words as a means for furnishing a supply of metal for reinforcing the aperture. The apertures 15, 16, and the displaced metal or filler 17 will be reversed as indicated in Figs. 3 and 4, the portion 18 of metal on one bar being adapted to enter the aperture 15 in the other bar while a similar action takes place between the metal 17 and the corresponding aperture in the other bar. Thus the two bars having the intermediate parallel portions 19, 20 will occupy the position shown in Fig. 5 and there will remain a small through opening formed by the semicircular recess 16 in the bars. This opening permits the entrance of the pointed end 21 of a forging tool 22. By the cooperation of a top die 23, as shown in Fig. 6, the metal at the junction of the two bars is flared, the size of the opening is increased and the portions 17, 18 of metal are riveted over, thus firmly uniting the two bars and providing a suitable seat for the tension rod. In its finished condition the fulcrum will appear as shown in Fig. 7.

In the modification shown in Figs 8 to 13 inclusive the bar is the same being composed of two sections 24, 25, having registering openings therein of a size corresponding to the semicircular openings in the form just described. In the openings I prefer to mount a split ferrule 26 which acts as the filler and supplies the metal necessary for reinforcement. Through the center of the ferrule there is a small opening 27. After the parts are combined, as shown in Figs. 8, 9 and 10, they are placed in a die such as shown in Fig. 11, the lower member 28 of which has a pointed projection 29 adapted to enter the opening 27 in the ferrule or filler while the top member 30 is shaped to cooperate therewith and to rivet the ferrule and spread the metal of the bars. Thus the size of the opening is increased and reinforced and the fulcrum is permanently joined. The finished article is shown in Figs. 12 and 13.

Obviously the invention is capable of much modification and I do not wish to be limited except as indicated in the appended claims.

I claim:

1. The method of making brake beam fulcrums which consists in preparing duplicate flat bars, then punching in the two bar openings of a size less than the diameter of the rod to be accommodated therein, then inserting a metallic filler adapted to occupy the opening thus formed, then forging the bars to increase the size of the opening, and to spread and rivet the filler around the sides of the opening.

2. The method of making fulcrums which consists in providing a pair of flat bars, then punching relatively small openings therein, then inserting a metallic filler adapted to occupy the opening thus formed, then placing said bars in juxtaposition with the filler of metal partially closing the thus formed openings, then forging the bars to increase the size of the opening through the associated bars and riveting the filler metal around the sides of the opening.

3. The method of making brake beam fulcrums which consists in punching a pair of flat bars and causing the punched metal to be displaced laterally and to lie on one side of the opening, then joining the two bars and causing the displaced metal of each bar to occupy the opening formed in the opposite bar, then forging the metal to enlarge the opening and rivet over the interengaging portions of the bars.

4. The method of forging fulcrums which consists in preparing a pair of flat bars, then punching semicircular openings therein, the punched metal being caused to project laterally at right angles from the bar and to be of a shape corresponding to the shape of the punched-out opening provided, the laterally projecting portions of the two bars occupying relatively opposite positions whereby they may interfit, then joining the two bars and causing the lateral projections to occupy the openings formed in the mating bar, then forging the bars to increase the size of the opening and rivet the projections.

5. The method of forging fulcrums which consists in preparing a pair of flat bars, then punching semicircular openings therein, the punched metal being caused to project laterally at right angles from the bar and to be of a shape corresponding to the shape of the punched-out opening provided, the laterally projecting portions of the two bars occupying relatively opposite positions whereby they may interfit, a small clear opening being provided through the two bars to permit the entrance of the point of a forging die.

6. A brake beam fulcrum comprising in combination two flat bars bent to provide means for attachment to a brake beam, each bar having an integral lateral projection, the projections on the two bars interfitting and being forged to rivet together the two bars and provide a flaring seat for a tension rod.

7. A brake beam fulcrum comprising in combination a pair of bars having an opening for a tension rod, said bars each having a lateral projection adapted to project into said opening and be riveted around the same, the metal of the bars being laterally expanded by the forging process.

Signed at Chicago, Illinois, this 12th day of October, 1920.

CARL E. BAUER.